United States Patent [19]
Kirishima et al.

[11] Patent Number: 5,503,812
[45] Date of Patent: Apr. 2, 1996

[54] METHOD FOR SEPARATING AND PURIFYING FISSION NOBLE METALS

[75] Inventors: Kenji Kirishima, Katsuta; Hisaaki Shimauchi, Naka; Hiroshi Nakahira, Kitasoma; Haruo Shibayama, Naka; Yukio Wada, Mito, all of Japan

[73] Assignees: Doryokuro Kakunenryo Kaihatsu Jigyodan; Sumitomo Metal Mining Co., Ltd., both of Tokyo, Japan

[21] Appl. No.: 302,895

[22] PCT Filed: Sep. 17, 1993

[86] PCT No.: PCT/JP93/01332

§ 371 Date: Sep. 19, 1994

§ 102(e) Date: Sep. 19, 1994

[30] Foreign Application Priority Data

Jan. 19, 1993  [JP]  Japan ................................ 5-006813

[51] Int. Cl.$^6$ ........................................... C01G 55/00
[52] U.S. Cl. ......................... 423/2; 423/22; 210/682
[58] Field of Search ............... 423/2, 8, 22; 210/681, 210/682

[56] References Cited

U.S. PATENT DOCUMENTS

| | | | |
|---|---|---|---|
| 3,979,498 | 9/1976 | Campbell | 423/2 |
| 4,162,231 | 7/1979 | Horwitz et al. | 423/2 |
| 4,290,967 | 9/1981 | Campbell et al. | 556/1 |
| 4,390,366 | 6/1983 | Lea et al. | 75/243 |
| 4,479,922 | 10/1984 | Haynes et al. | 423/22 |
| 5,171,546 | 12/1992 | Guy et al. | 423/8 |
| 5,292,491 | 3/1994 | Schumacher | 423/22 |

FOREIGN PATENT DOCUMENTS

| | | |
|---|---|---|
| 59-179724 | 10/1984 | Japan. |
| 60-86220 | 5/1985 | Japan. |
| 61-41728 | 2/1986 | Japan. |
| 64-21020 | 1/1989 | Japan. |
| 1-263228 | 10/1989 | Japan. |
| 1-270511 | 10/1989 | Japan. |
| 2-59552 | 2/1990 | Japan. |
| 2-213426 | 8/1990 | Japan. |
| 4-99233 | 3/1992 | Japan. |
| 4-106499 | 4/1992 | Japan. |

OTHER PUBLICATIONS

Preliminary Report of 1992 Fall Meeting of the Atomic Energy Society of Japan (Oct. 20–23, 1992); "H23: Study on Recovery and Utilization of Noble Metals from Insoluble Residue (III)—Study on Mutual Separation of Noble metals and Evaluation of Radioactivity", published Sep. 20, 1992.

Jensen et al., "Recovery of Noble Metals from Fission Products", Nuclear Technology, vol. 65, pp. 305–324, May (1984).

Preliminary Report of 1989 Fall Meeting of the Atomic Energy Society of Japan (Oct. 17–19, 1989); "H69: Recovery of Noble Metals from HLLW by Lead Extraction Method".

Naito et al., "Recovery of Noble Metals from Insoluble Residue of Spent Fuel", Journal of Nuclear Science and Technology, vol. 23, 6, pp. 64–72 (1986).

*Primary Examiner*—Ngoclan Mai
*Attorney, Agent, or Firm*—Wenderoth, Lind & Ponack

[57] ABSTRACT

Fission noble metals contained in an insoluble residue and/or a high-level radioactive liquid waste generated in the step of reprocessing spent nuclear fuels are dissolved in nitric acid to prepare a palladium-containing nitric acid solution, which is then brought into liquid-liquid contact with an extracting solvent containing a dialkyl sulfide in which each alkyl group has 4 to 10 carbon atoms as an extractant to extract the palladium component into the extracting solvent. The palladium-containing extracting solvent is brought into liquid-liquid contact with an aqueous thio compound solution or aqueous ammonia solution to strip the palladium component into the aqueous solution. A borohydride compound in added to the palladium-containing aqueous solution to precipitate palladium from this solution by reduction, and metallic palladium is recovered by separating the precipitate from the aqueous solution.

7 Claims, 1 Drawing Sheet

METHOD FOR SEPARATING AND PURIFYING FISSION NOBLE METALS

TECHNICAL FIELD

The present invention relates to a method for separating and purifying palladium by solvent extraction. In particular, the Present invention relates to a method for selectively and efficiently recovering and highly purifying palladium from fission noble metals contained in an insoluble residue and high-level radioactive liquid waste generated in the step of reprocessing spent nuclear fuel.

BACKGROUND ART

Spent nuclear fuel generated in a nuclear power plant contains nuclides mainly comprising unburnt $^{235}U$ and $^{239}Pu$ formed from $^{238}U$ contained in the fuel in addition to fission products, though they vary depending on the composition of the fuel, burnup and cooling time.

Recently, spent nuclear fuel is reprocessed by finely shearing it and chemically processing the sheared fuel to recover reusable uranium and plutonium in order to effectively use uranium resources. A high-level radioactive liquid waste generated in the course of this reprocessing contains fission noble metals such as ruthenium (Ru), palladium (Pd) and rhodium (Rh) in amounts of as high as one tenth of the whole fission products.

After being reprocessed with nitric acid, these fission noble metals are contained in both high-level radioactive liquid waste and solid particles (hereinafter referred to as the insoluble residue) mainly comprising platinum group elements difficultly soluble in nitric acid. The recovery of the fission noble metals from the high-level radioactive liquid waste and the insoluble residue is regarded as important from the viewpoint of the use of rare metals as the resource, and industrial methods for selectively separating these noble metals from the high-level radioactive liquid waste and the insoluble residue have been developed and proposed.

For example, a method for recovering the noble metals from the high-level radioactive liquid waste is reported in G. A. Jansen et al., *Nuclear Technology*, Vol. 65, May (1984), Preliminary Report of 1989 Fall Meeting of the Atomic Energy Society of Japan, etc. Further, a method for recovering the noble metals from the insoluble residue is reported in Japanese. Patent Laid-Open Specification No. 4-106499 (1992) and K. Naito, T. Matsui and T. Tanaka, *Journal of Nuclear Science and Technology*, Vol. 23, 6 (1986).

It is reported that the fission noble metals are efficiently recovered in a lump by these methods. However, the recovered noble metals include ruthenium having a particularly high radioactivity and palladium and technetium both having a long half-life and, therefore, these platinum-group elements must be separated from each other in order to separate and recover the most valuable rhodium. Thus, the development of such a technique is eagerly demanded.

Investigations have been made hitherto on the separation of the platinum-group elements and so on from each other by the solvent extraction, ion exchange, adsorption, precipitation, electrolytic reduction or distillation method. However, these methods are substantially unsuitable for the practical use, because high-degree mutual separation of the elements is insufficient.

DISCLOSURE OF THE INVENTION

The present invention aims at solving the above-described problem, and an object of the invention is to provide a separation and purification method for effectively recovering high-purity metallic palladium from a palladium-containing nitric acid solution obtained from the insoluble residue and high-level radioactive liquid waste generated in the step of reprocessing spent nuclear fuels.

The method of the present invention for separating and purifying the fission noble metals comprises dissolving fission noble metals that are contained in an insoluble residue, a high-level radioactive liquid waste or a mixture thereof generated in the step of reprocessing spent nuclear fuels in nitric acid to prepare a palladium-containing nitric acid solution, bringing the nitric acid solution into liquid-liquid contact with an extracting solvent containing a dialkyl sulfide in which each alkyl group has 4 to 10 carbon atoms as an extractant to extract the palladium component into the extracting solvent, bringing the palladium-containing extracting solvent into liquid-liquid contact with an aqueous thio compound solution or aqueous ammonia solution to strip the palladium component into the aqueous solution, adding a borohydride compound to the palladium-containing aqueous solution to precipitate palladium from the aqueous solution by reduction, and separating the precipitate from the aqueous solution by a suitable solid-liquid separation method to recover metallic palladium.

BEST MODE FOR CARRYING OUT THE INVENTION

Figure 1:
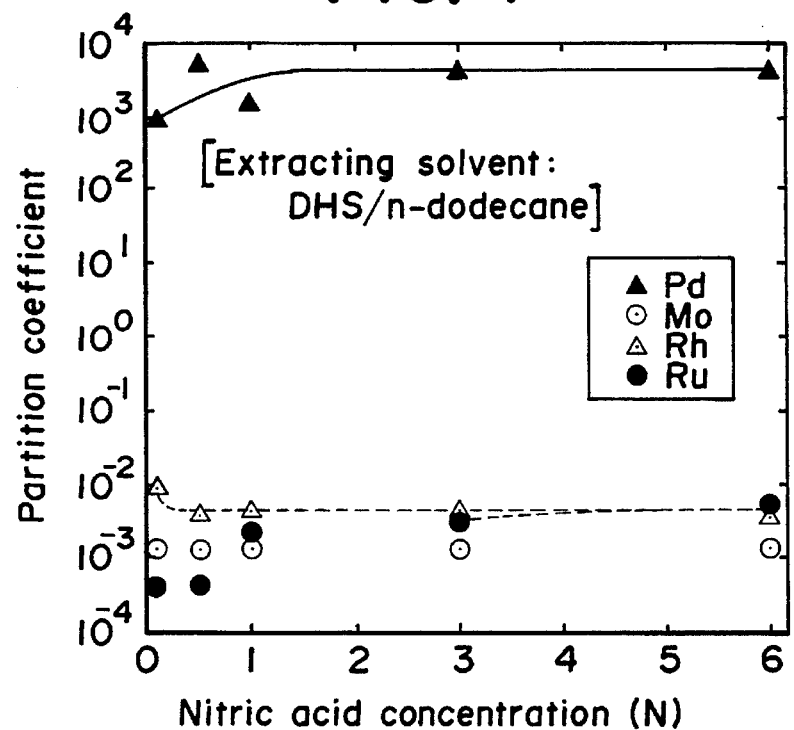
FIG. 1 is a graph showing the relationship between the partition coefficient of each metal element extracted in Example 1 of the present invention in an organic phase and the concentration of nitric acid.

The present invention aims at selectively and efficiently separating palladium from a palladium-containing nitric acid solution prepared by dissolving fission noble metals contained in a insoluble residue, a high-level radioactive liquid waste or a mixture thereof generated in the step of reprocessing spent nuclear fuels, by solvent extraction method to give purified palladium. The fission noble metals contained in the insoluble residue and high-level radioactive liquid waste include ruthenium (Ru), rhodium (Rh) and palladium (Pd). Further, fission products such as molybdenum are also contained therein. In the present invention, the palladium-containing nitric acid solution is brought into liquid-liquid contact with an extracting solvent containing a dialkyl sulfide: R-S-R (wherein each R represents an alkyl group having 4 to 10 carbon atoms) as an extractant to extract palladium into the organic phase (extracting solvent phase). When the number of carbon atoms of the alkyl groups of the dialkyl sulfide used as the extractant is below 4, the water solubility is increased and, therefore, the extractant migrates into the aqueous phase and is lost. When the number of carbon atoms of the alkyl groups is above 10, the viscosity of the extracting solvent containing the extractant is increased to make the separation of the aqueous phase from the organic phase difficult. The dialkyl sulfides include, for example, dibutyl sulfide, dihexyl sulfide, diheptyl sulfide, dioctyl sulfide and didecyl sulfide. The extractant can be used also in the form of a mixture of two or more of them. Further, diesel oil (DO) which is relatively easily available at a low cost is also usable.

The extractant is mixed with a diluent to give the extracting solvent. The diluents usable herein are ordinary ones in which the extractant is soluble. Preferred diluents are, for example, paraffinic hydrocarbons and aromatic hydrocarbons. The amount of the extractant is in the range of usually 100 to 0.5% by weight, preferably 50 to 1% by weight based on the diluent.

In the liquid-liquid extraction, the palladium-containing nitric acid solution may contain free nitric acid. The nitric acid concentration in the nitric acid solution is preferably in the range of 0.1 to 6N. Although palladium can be sufficiently extracted even when the palladium-containing nitric acid solution has a higher nitric acid concentration, the use of an excess amount of nitric acid is economically disadvantageous and it might cause deterioration of the extractant and diluent.

The liquid-liquid contact of the aqueous phase with the organic phase is conducted with a liquid-liquid contact apparatus such as a pulsed column or a mixer-settler to give a high yield of highly pure palladium by extraction into the organic phase.

In the present invention, the palladium-containing extracting solvent thus obtained is brought into liquid-liquid contact with an aqueous thio compound solution or aqueous ammonia solution to strip palladium into the aqueous solution. The thio compounds used as the stripping agent include, for example, thiourea and thiosulfates.

The concentration of the thio compound or ammonia used is usually in the range of 0.1 to 5 mol/l to the saturation concentration. When the aqueous ammonia solution is used as the stripping agent, palladium is apt to form a stable amine complex to make the separation and recovering in the subsequent step complicated. Usually an aqueous thiourea solution having a concentration of 0.1 to 2 mol/l is the most desirable.

The stripping of palladium with thiourea is thought to proceed via a complex-forming reaction of the following formula $$Pd^{2+} + 2CS(NH_2)_2 = [Pd(CS(NH_2)_2)_2]^{2+}$$

As for the amount of thiourea necessitated for the stripping of palladium, about two equivalents of thiourea is enough per equivalent of palladium contained in the extracting solvent.

In order to recover palladium in the form of metallic palladium from the palladium-containing aqueous solution obtained as described above, a borohydride compound is added to this aqueous solution. Palladium is thus reduced and precipitated in the aqueous solution, and the precipitate is separated by a suitable solid-liquid separation method such as filtration to recover metallic palladium (palladium black). The borohydride compounds usable herein are those capable of reacting with water to release hydrogen, such as sodium borohydride and potassium borohydride.

The following Examples will further illustrate the present invention.

Example 1

The compositions of the insoluble residue and high-level radioactive liquid waste from which the fission noble metals are to be recovered vary depending on the composition of the nuclear fuel and burnup thereof. Many of the fission noble metals formed in, for example, a light water reactor migrate into the insoluble residue. In one example of the composition of the insoluble residue, the content (4) of each of molybdenum, technetium, ruthenium, rhodium and palladium atoms is roughly as follows Mo:Tc:Ru:Rh:Pd=20:5:55:10:10.

In this Example, solutions of each of the four elements, i.e. molybdenum, ruthenium, rhodium and palladium, in nitric acid were separately prepared and then mixed together so that the relative concentrations (mg/l) of the respective elements would be as follows to give a solution of a simulated insoluble residue in nitric acid

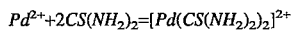

Mo:Ru:Rh:Pd=20:60:10:10

In order to examine the influence of the concentration of nitric acid on the extraction of the respective elements into the organic phase (extracting solvent phase), samples having various nitric acid concentrations in the range of 0.1 to 6N in the nitric acid solution were prepared.

100 ml of the nitric acid solution prepared as described above and 100 ml of an extracting solvent mixture comprising 10% of DHS (dihexyl sulfide) (trade name "SFI-6R", a product of Daihachi Chemical Industry Co., Ltd.) and 90% of n-dodecane were fed into a separating funnel, and mixed by using a shaker for 5 minutes to extract palladium into the organic phase. After the completion of the extraction, the concentration of each of the elements in the liquid extraction residue and the organic phase was determined with an emission spectrophotometer to calculate the partition coefficient of each element in the organic phase, thereby obtaining the results given in FIG. 1.

In FIG. 1, the abscissa represents the nitric acid concentration in the nitric acid solution in the course of extraction, while the ordinate represents the partition coefficient of each element. The solid line in the figure represents the relationship between the partition coefficient of palladium and the nitric acid concentration. It is shown that 99.9% or more of palladium is extracted with the extracting solvent mixture composed of 10% DHS and 90% n-dodecane when the nitric acid concentration is in the range of 0.1 to 6N. The difference in the partition coefficient between palladium and other elements was about $10^5$.

Then, 100 ml of a 0.13 mol/l aqueous thiourea solution was added to the palladium-containing extracting solvent obtained as described above, and the stripping (single-stage stripping) was conducted under the same conditions as those of the above-described extraction operation. The palladium concentration in the aqueous phase (palladium-containing aqueous thiourea solution) after the stripping was determined with an emission spectrophotometer to calculate the percentage stripping. The results are given in FIG. 1. It was found that when the aqueous thiourea solution was used as the stripping agent, 92% or more of the palladium component was stripped from the palladium-containing extracting solvent and migrated into the aqueous phase by the single-stage stripping operation.

The results obtained by the same operation (single-stage stripping) as that described above except that 5 mol/l of aqueous ammonia solution was used as the stripping agent are also given in Table 1. It was found that when the aqueous ammonia solution was used as the stripping agent, 99% or more of the palladium component was stripped from the palladium-containing extracting solvent and migrated into the aqueous phase by the single-stage stripping operation.

TABLE 1

Results of stripping test

| Stripping agent | Extractant Percentage stripping (%) | |
| --- | --- | --- |
| | DHS/n-decane | DHS/Shellsol AB |
| Aqueous thiourea solution | ≧92 | ≧98 |
| Aqueous ammonia solution | ≧99 | ≧99 |

In order to recover palladium in metallic form from the palladium-containing aqueous solution obtained as described above, 5 ml of a 1 wt. % sodium borohydride solution as the reducing agent was added to the aqueous phase (palladium-containing aqueous thiourea solution) obtained after the completion of the stripping, and the resultant mixture was heated at a low temperature (40° C.) for 15 minutes. A precipitate (metallic palladium: palladium black) thus formed was separated by filtration, and then weight after the solid-liquid separation to determine the recovery of palladium black, thereby finding that metallic palladium having a purity of as high as 99.9% or more could be recovered in a high yield.

EXAMPLE 2

After conducting lead extraction of the same simulated insoluble residue comprising tile four elements as that of Example 1, it was dissolved in nitric acid to prepare a solution for use herein. The relative concentration (mg/l) of each elements in the nitric acid solution was as follows:

Mo:Ru:Pd:Rh:Pb=20:60:10:10:4000

The nitric acid concentration in the nitric acid solution was adjusted in the range of 0.1 to 6N.

100 ml of the nitric acid solution prepared as described above and 100 ml of an extracting solvent mixture comprising 10% of DHS and 904 of Shellsol AB were fed into a separating funnel, and mixed by using a shaker for 5 minutes to extract palladium from the nitric acid solution into the organic phase. After the completion of the extraction, the concentration of each of the elements in the liquid extraction residue and the organic phase was determined with an emission spectrophotometer to calculate the partition coefficient of each element in the organic phase, thereby giving the results given in FIG. 2.

Figure 2:
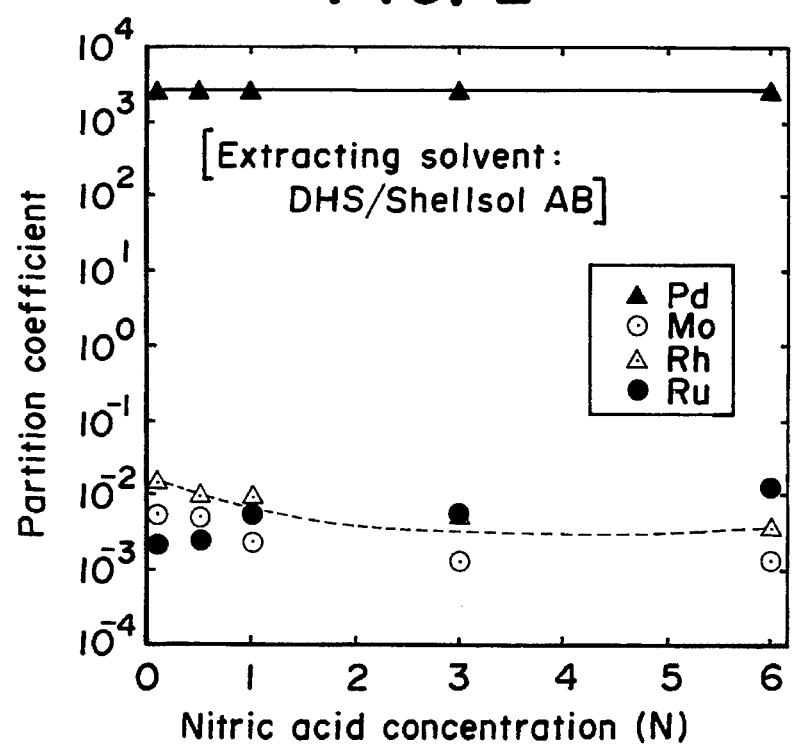
FIG. 2 is a graph showing the relationship between the partition coefficient of each metal element extracted in Example 2 of the present invention in an organic phase and the concentration of nitric acid.

In FIG. 2, the abscissa represents the nitric acid concentration in the nitric acid solution in the course of extraction, while the ordinate represents the partition coefficient of each element. The solid line in FIG. 2 represents the relationship between the partition coefficient of palladium and the nitric acid concentration. It is shown that 99.9% or more of palladium is extracted with the extracting solvent mixture composed of 10% DHS and 90% Shellsol AB when the nitric acid concentration is in the range of 0.1 to 6N. The difference in the partition coefficient between palladium and other elements was about $10^5$.

Then, 100 ml of a 0.13 mol/l aqueous thiourea solution was added to the palladium-containing extracting solvent obtained as described above, and stripping (single-stage stripping) was conducted under the same conditions as those of the above-described extraction operation. The palladium concentration in the aqueous phase (palladium-containing aqueous thiourea solution) after the stripping was determined with an emission spectrophotometer to calculate the percentage stripping. The results are given in FIG. 1. It was found that when thiourea was used as the stripping agent, 984 or more of the palladium component was stripped from the palladium-containing extracting solvent and migrated into the aqueous phase by the single-stage stripping operation.

The results obtained by the same operation (single-stage stripping as that described above except that 5 mol/l aqueous ammonia solution was used as the stripping agent are also given in Table 1. It was found that when the aqueous ammonia solution was used as the stripping agent, 994 or more of the palladium component was stripped from the palladium-containing extracting solvent and migrated into the aqueous phase by the single-stage stripping operation.

In order to recover palladium in metallic form from the palladium-containing aqueous solution obtained as described above, 5 ml of a 1 wt. % sodium borohydride solution as the reducing agent was added to the aqueous phase (palladium-containing aqueous thiourea solution) obtained after the completion of the stripping, and the resultant mixture was heat-ed at a low temperature (40° C.) for 15 minutes. A precipitate (metallic palladium: palladium black) thus formed was separated by filtration, and the precipitate was weighed after the solid-liquid separation to determine the recovery of palladium black. It was found that metallic palladium having a purity of as high as 99.9% or more could be recovered in a high yield.

As described above, the present invention enables highly pure palladium to be selectively and efficiently recovered from the solution in nitric acid of the fission noble metals contained in the insoluble residue and high-level radioactive liquid waste generated in the step of reprocessing spent nuclear fuels.

We claim:

1. A method for separating and purifying fission noble metals comprising:

dissolving fission noble metals that are contained in an insoluble residue, a high-level radioactive liquid waste or a mixture thereof generated in the step of reprocessing spent nuclear fuels in nitric acid to prepare a palladium-containing nitric acid solution, bringing the nitric acid solution into liquid-liquid contact with an extracting solvent containing a dialkyl sulfide of the general formula: R-S-R (wherein each R represents an alkyl group having 4 to 10 carbon atoms) as an extractant to extract the palladium component into the extracting solvent, bringing the palladium-containing extracting solvent into liquid-liquid contact with an aqueous thio compound solution or aqueous ammonia solution to strip the palladium component into the aqueous solution, adding a borohydride compound to the palladium-containing aqueous solution to precipitate palladium from the aqueous solution by reduction, and separating the precipitate from the aqueous solution by a suitable solid-liquid separation method to recover metallic palladium.

2. The method according to claim 1, wherein the nitric acid concentration in the nitric acid solution is 0.1 to 6N.

3. The method according to claim 1, wherein the extracting solvent is a mixture of a dialkyl sulfide as the extractant and a hydrocarbon as the diluent.

4. The method according to claim 3, wherein the amount of the extractant is 100 to 0.5% by weight based on the diluent.

5. The method according to claim 4, wherein the amount of the extractant is 50 to 1% by weight based on the diluent.

6. The method according to claim 1, wherein the concentration of the thio compound or ammonia in the aqueous thio compound solution or aqueous ammonia solution is in the range of 0.1 mol/l to the saturation concentration.

7. The method according to claim 1, wherein the aqueous thio compound solution is an aqueous thiourea solution having a concentration of 0.1 to 2 mol/l.

* * * * *